United States Patent [19]
Kawasumi

[11] Patent Number: 4,770,082
[45] Date of Patent: Sep. 13, 1988

[54] VACUUM BOOSTER FOR AUTOMOBILES
[75] Inventor: Satoshi Kawasumi, Takahama, Japan
[73] Assignee: Aisin Seiki Kabushiki Kaisha, Kariya, Japan
[21] Appl. No.: 9,258
[22] Filed: Jan. 30, 1987
[30] Foreign Application Priority Data
  Jan. 31, 1986 [JP] Japan ............................ 61-13491[U]
[51] Int. Cl.$^4$ .............................................. F15B 9/10
[52] U.S. Cl. ................................ 91/376 R; 91/369.2; 137/627.5
[58] Field of Search ........................ 91/369 A, 376 R; 137/627.5

[56] References Cited
U.S. PATENT DOCUMENTS

| | | | |
|---|---|---|---|
| 4,085,656 | 4/1978 | Ando | 137/627.5 X |
| 4,350,076 | 9/1982 | Thiel | 91/376 R |
| 4,472,997 | 9/1984 | Ohmi . | |
| 4,587,885 | 5/1986 | Boehm et al. . | |
| 4,590,845 | 5/1986 | Tateoka et al. . | |
| 4,594,937 | 6/1986 | Meynier et al. . | |
| 4,598,625 | 7/1986 | Belart . | |
| 4,619,185 | 10/1986 | Mori et al. . | |

FOREIGN PATENT DOCUMENTS

| | | | |
|---|---|---|---|
| 128041 | 7/1984 | Japan | 91/376 R |
| 2157378 | 10/1985 | United Kingdom | 91/376 R |

Primary Examiner—Robert G. Nilson
Attorney, Agent, or Firm—Burns, Doane, Swecker & Mathis

[57] ABSTRACT

A vacuum booster comprising a push rod, a housing including a front and rear shells connected with each other, a power piston located in the housing and dividing an interior of the housing into a constant pressure chamber and a variable pressure chamber with a diaphragm, a valve plunger located within the power piston and a control valve member located in the power piston. The power piston has a valve seat contactable with the control valve, and the seat surface of the valve plunger is separable from the control valve member. The seat surface of the valve plunger includes a circular spherical seat surface, and a seal surface of the control valve member contacted with the seat surface includes a concave spherical seat surface which the seat surface of the valve plunger touches internally.

4 Claims, 2 Drawing Sheets

VACUUM BOOSTER FOR AUTOMOBILES

BACKGROUND OF THE INVENTION

1. Field of the Invention

The invention relates to a vacuum booster for reducing the force required for operating a pedal-operated brake system of automobiles and, more particularly, to a control valve mechanism which is operated by a push rod linked to the brake pedal which controls a pressure differential between front and rear chambers in the housing.

2. Description of the Prior Art

A vacuum booster for automobiles of a prior type is described, for example, in Japanese Utility Model Laid-Open No. 57-92569.

Referring to FIG. 4, in the aforementioned prior arrangement there is provided a vacuum booster which includes a control valve mechanism comprising a valve plunger 53 connected with a front end portion of a push rod 51. The valve plunger 53 is slidably disposed within a power piston 52. In the rest state, a control valve element 54 contacts a seat surface 53a of the rear end portion of the valve plunger 53. As a result of the displacement of the valve plunger 53, the control valve element 54 contacts a valve seat 52a of the power piston 52. Thereafter, the valve plunger 53 separates from the control valve element 54, whereupon a pressure differential is produced between front and rear chambers of the power piston 52 so that the desired operational pressure force is produced by the booster push rod 51.

In this prior arrangement, the seat surface 53a of the rear end portion of the valve plunger 53 is spherical so as to prevent performance degradation of the vacuum booster due to degradation of contact between the valve seat 52a of the power piston 52 and the control valve element 54 on account of an inclination of the valve plunger 53 and the control valve element 54 arising from clearance between the valve plunger 53 and the power piston 52.

In this prior arrangement, however, because the seat surface 53a of the rear end portion of the valve plunger is spherical, it is necessary to form a circular projection on the thickness portion of a membrane required for shaping the control valve member 54 in order to raise the surface pressure of the seal surface. As a result, the thickness of the circular projection will be large, and the seat surface of the valve plunger in contact with the control valve element in the normal condition elastically deforms the circular projection to a large extent so as to assure that the communication between the atmosphere and the chamber in the housing is interrupted. Therefore, there will be an increase in the deformation of the circular projection in a needful stroke of the brake pedal which is required to operate the vacuum booster by separating from the surface of the valve plunger. Consequently, the prior arrangement has a drawback which has a bad influence on the feeling of the brake operation.

SUMMARY OF THE INVENTION

It is, therefore, a primary object of the present invention to eliminate the disadvantages of the prior art by reducing an invalid stroke of the brake pedal. It is another object of the present invention to provide a vacuum booster including a control valve mechanism which prevents the functional degradation of the vacuum booster which is brought on by degradation of contact between the valve seat of the power piston and the control valve on account of an inclination of the valve plunger and the control valve arising from the clearance between the valve plunger and the power piston.

According to the present invention, the seat surface of the valve plunger is circular spherical and the seal surface of the control valve contacted with the seat surface of the valve plunger is a concave spherical surface which the seat surface of the valve plunger internally contacts. As a result, even though the valve plunger is inclined because of the clearance between the valve plunger and the power piston, the valve plunger is inclined such that the circular spherical seat surface of the valve plunger may slide on the concave spherical seal surface of the control valve element without the circular spherical seat surface of the valve plunger separating from the control valve element. Accordingly, close contact between the valve seat of the power piston and the control valve element will not be harmed, so that the inclination of the valve plunger will be transmitted to the control valve element. Accordingly, there is no need to form a projection on a thickness portion of the membrane. In other words, the surface of the control valve element which is contacted with the seat surface of the valve plunger may be just as thick as the thickness portion of the membrane required for shaping the control valve element. Therefore, the needful stroke (namely, the invalid stroke) of the brake pedal which is required to operate the vacuum booster does not increase, with the result that there is no bad influences on the feeling of the brake operation.

BRIEF DESCRIPTION OF THE DRAWING

Various other objects, features and attendant advantages of the present invention will be more fully appreciated from the following detailed description when considered in connection with the accompanying drawings in which like reference characters designate like or corresponding parts throughout the several views and wherein.

DETAILED DESCRIPTION OF THE PREFERRED EMBODIMENT

Figure 1:
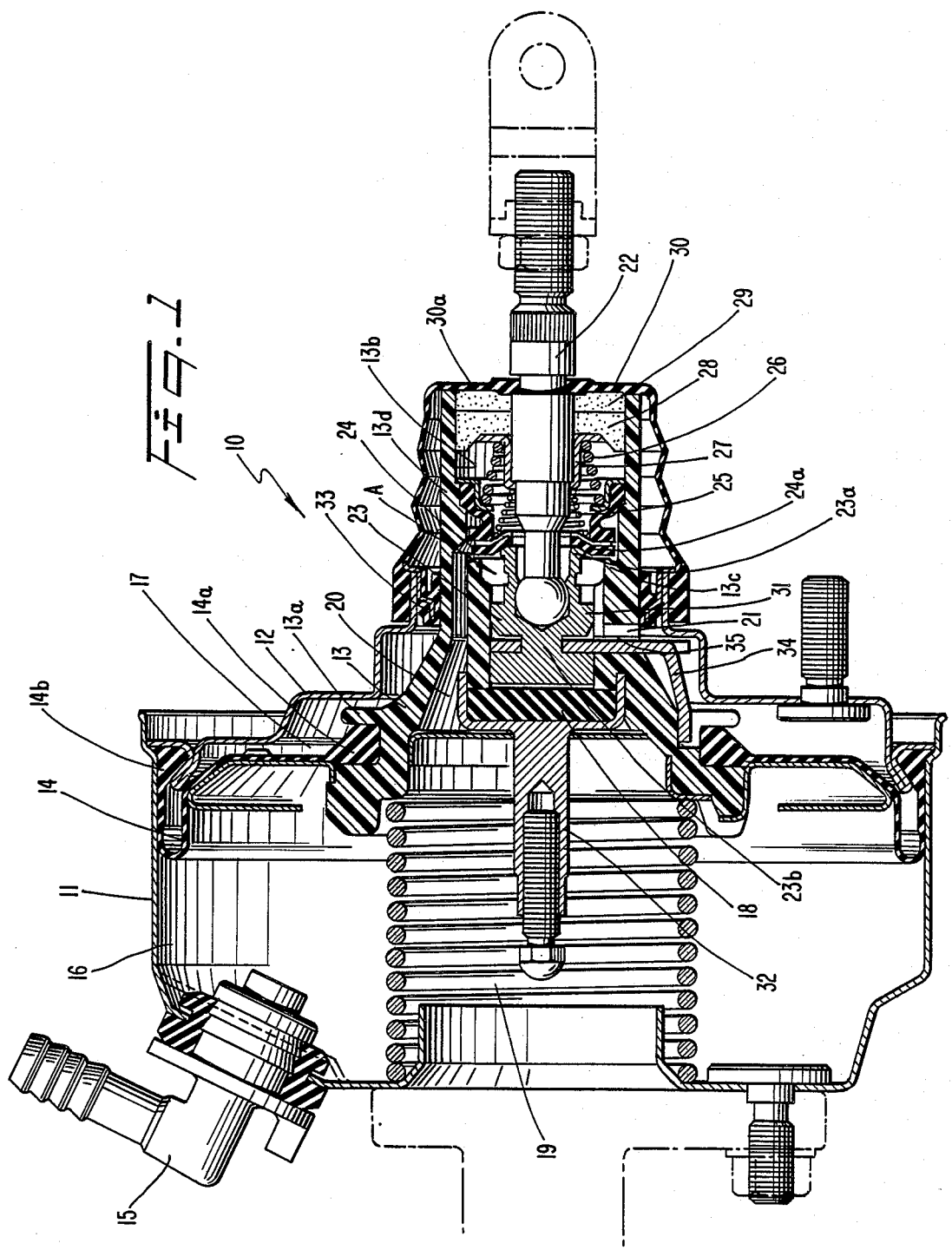
FIG. 1 is a cross-sectional view of a preferred embodiment of the present invention.
Figure 2:
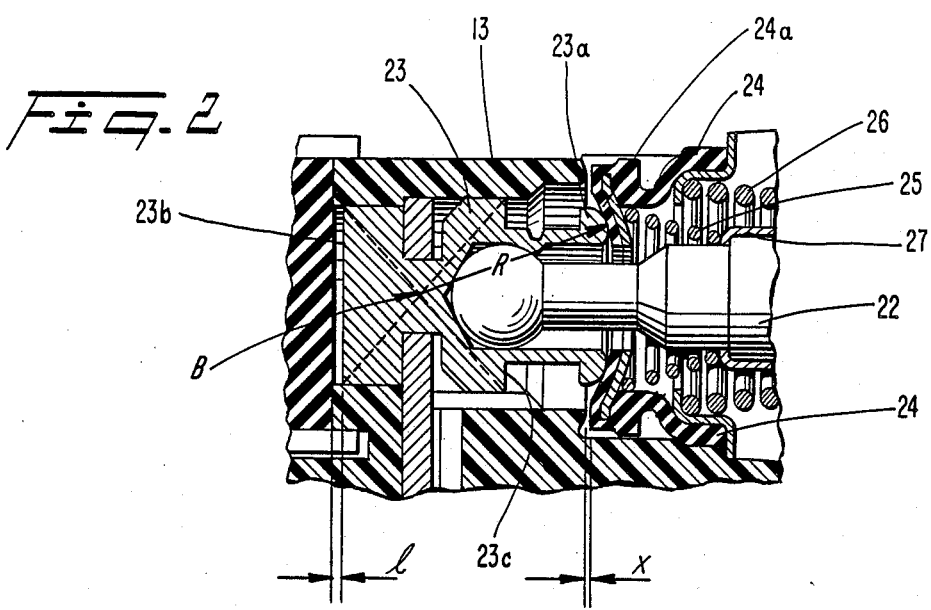
FIG. 2 is a cross-sectional view of the control valve mechanism of FIG. 1.
Figure 3:
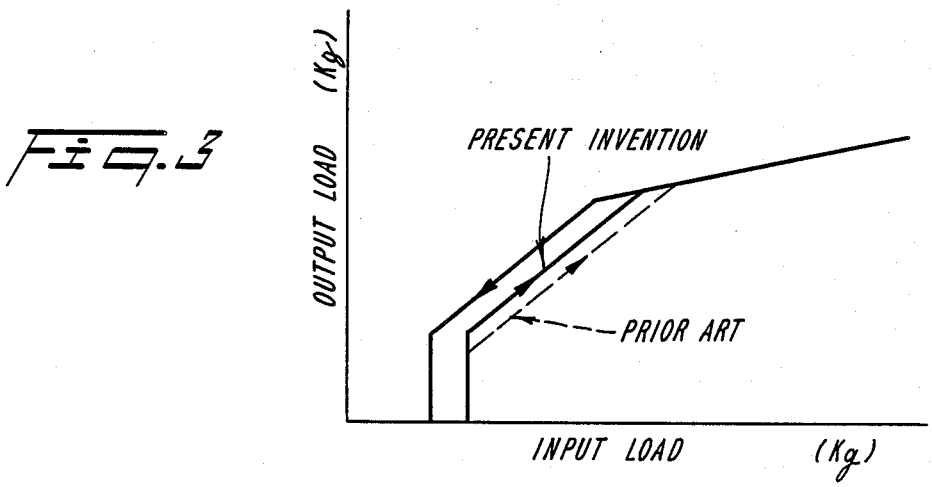
FIG. 3 is a diagram of the relationship between the input load and output load of the first preferred embodiment.
Figure 4:
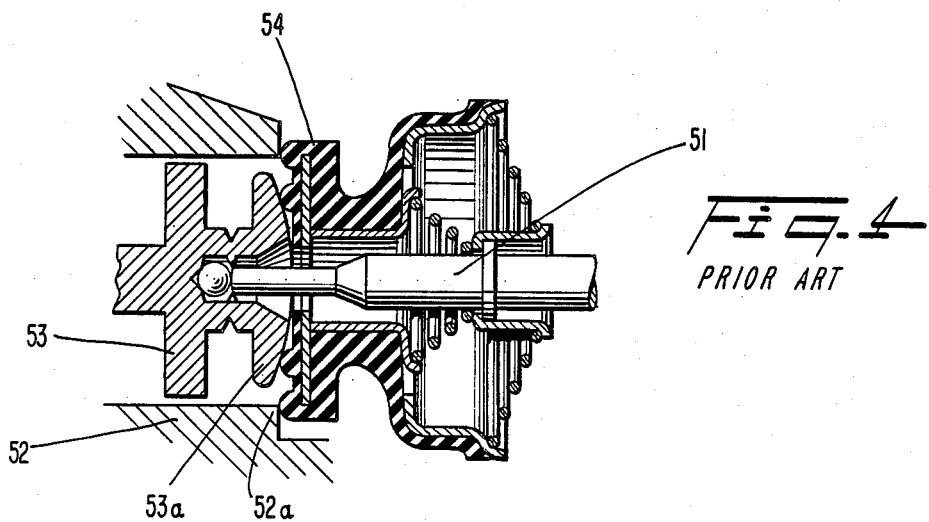
FIG. 4 is a cross-sectional view of a control valve mechanism of the prior art.

Referring to FIGS. 1–3, a vacuum booster 10 according to a preferred embodiment of the present invention is provided for assisting the operation of automobile brakes (not shown). The vacuum booster 10 includes a front shell 11 and a rear shell 12 connected with each other by a suitable connecting mechanism (not shown). The interior space enclosed by the shells 11 and 12 is divided into a constant pressure chamber 16 and a variable pressure chamber 17 by a power piston 13 movable in the shells 11 and 12 and a diaphragm member 14 made of a rubber material. The power piston 13 has a central hub portion made of a resinous material and a metallic disc portion integrally connected to the hub portion. An outer bead portion 14b of the diaphragm 14 is hermetically clamped by the front shell 11 and the rear shell 12. The inner bead portion 14a of the diaphragm 14 is air-tightly fixed in an outer groove 13a of the power piston 13. The constant pressure chamber 16 communicates with a vacuum source (for example, in this embodiment, to the intake manifold of an engine) through a check valve 15. As a result, the constant pressure chamber 16 is normally maintained in a state of vacuum. The variable pressure chamber 17 is selectively connected with the constant chamber 16 or the atmosphere by a control valve mechanism A provided in the power piston 13. The power piston 13 has a cylindrical portion 13d extending rearwardly (to the right of FIG. 1) and protruding at the right end thereof outwardly from the rear wall of the rear shell 12.

A seal member 33 is inserted between the rear wall of the rear shell 12 and the outer surface of the cylindrical portion of the power piston 13 to air tightly support the cylindrical portion.

The power piston 13 has a groove at the left end surface thereof, and a booster push rod 32, which pushes a master cylinder piston (not shown), is inserted in the groove of the power piston 13 and through a reaction disc 18 made of a rubber material. A small space is formed between the reaction disc 18 and the valve plunger 23. A return spring 19 in the constant pressure chamber 16 is disposed between the inner wall of the front shell 11 and a stepped portion of the power piston 13. As a result, the power piston 13 is biased by the return spring 19. The power piston 13 is provided with a first air passage 20, which establishes a fluid communication between the constant pressure chamber 16 and the variable pressure chamber 17, and second air passages 21 and 31, which introduce ambient air into the variable pressure chamber 17 through the control valve mechanism A.

Referring to FIG. 1 and FIG. 2, the power piston 13 has a hollow portion 13b formed in the center thereof, within which the control valve mechanism A is located in order to control the pressure differential between the constant pressure chamber 16 and the variable pressure chamber 17. The control valve mechanism A comprises a push rod 22, a valve plunger 23, a control valve element 24 made of a rubber material, springs 25, 26 and a key member 34. The push rod 22 is connected to a typical brake pedal (not shown) and is moved in an axial direction in response to the movements of the brake pedal. The valve plunger 23 is connected with the left end of the push rod 22 by a well-known ball-joint mechanism.

The valve plunger 23 has a circular spherical seat 23a at the rear end thereof. The control valve element 24 has a front end surface which may be contacted with and separated from both the circular spherical seat 23a of the rear end portion of the valve plunger 23 and the valve seat 13c which is provided on a stepped portion of the hollow portion 13b of the power piston 13. Accordingly, the valve seat 13c is positionable in a radially outward direction from the spherical seat 23a. The front end surface of the control valve element 24 includes a concave spherical surface seal 24a which the seat 23a of the valve plunger touches internally. An outer side surface of the control valve element 24 is stepped so as to prevent the inclination in the power piston 13. On the other hand, the rear end portion of the control valve element 24 is secured to an inside surface of the hollow portion 13b of the power piston 13. The concave spherical seal 24a of the control valve element 24 is normally air-tightly contacted with the seat 23a of the rear end portion of the valve plunger 23 by the biasing force of the spring 25 which urges the concave spherical seal 24a of the control valve 24 toward the left and by the biasing force of the spring 26 which urges the push rod 22 and the retainer 27 toward the right. The biasing force of the spring 26 is selected to be greater than that of the spring 25.

Filters 28 and 29 are inserted in the rear end portion of the hollow portion 13b of the power piston 23 so as to prevent the invasion of foreign substances into the control valve mechanism A. The cylindrical portion 13d of the power piston 13 is surrounded by a boot member 30 having an air passage hole 30a so as to protect the cylindrical portion 13d of the power piston 13.

The key member 34 is inserted in an opening portion 35 of the power piston 13 and is further engaged with a reduced diameter portion 23b of the valve plunger 23 having a slit portion provided in the key member 34. Thus the rearmost position of the valve plunger 23 is defined by the key member 34. The key member 34 is able to be moved a predetermined distance toward the front and rear in an opening portion 35 and is provided with a pair of arm portions (not shown) extending along an outer circumference of the power piston 13. When the vacuum booster 10 is not operated, the power piston 13 is maintained at the rearmost position by the return spring 19 as shown in FIG. 1. At this time the arm portions are contacted with the inner surface of the rear shell 12. In this situation, the rearmost positioning of the power piston 13 is limited due to the front-side surface of an opening portion 35 of the power piston contacting the front-side surface of the key member 34.

In operation, when a vaouum booster 10 is not operated, namely when the brake pedal is not depressed, as shown in FIG. 1, the concave spherical seal 24a of the control valve element 24 is air-tightly contacted with the circular spherical seat 23a of the valve plunger 23, and is separated from the valve seat 13c of the power piston by only a small distance X. Consequently, the vacuum pressure in the constant pressure chamber 16 is communicated with the variable pressure chamber 17 by the second air passages 21 and 31 provided in the power piston 13, by the clearance between the seal 24a of the control valve element 24 and the valve seat 13c of the power piston 13, and by the first air passage 20 provided in the power piston 13. The power piston 13 thus maintains its retracted position (shown in FIG. 1) by the biasing force of the return spring 19. Therefore, a pressure differential is not produced between the constant pressure chamber 16 and variable pressure chamber 17.

When the brake pedal is depressed, the push rod 22 is moved toward the left in the power piston 13 so as to move the valve plunger 23 in the same direction (i.e., to the left of FIG. 1). Thereupon, the control valve element 24 is moved to the left by the spring 25 so that the control valve element 24 is seated on the valve seat 13c provided on the power piston 13, thereby interrupting a fluid communication between the constant pressure chamber 16 and the variable pressure chamber 17.

At this time, even though the valve plunger 23 is inclined because of the clearance between the valve plunger 23 and the power piston 13, the valve plunger 23 is inclined singlehanded so that the circular spherical seat 23a of the valve plunger 23 may slide on the concave spherical seal 24a of the control valve 24 without the circular spherical seat 23a of the valve plunger 23 becoming separated from the control valve element 24. Accordingly, the close contact between the valve seat 13c and the control valve element 24 will not be interrupted, so that the inclination of the valve plunger 23 will be transmitted to the control valve 24.

When the brake pedal is further depressed from this stage, the push rod 22 pushes the valve plunger 23 toward the left into the power piston 13 as the push rod 22 compresses the springs 25 and 26. Thereupon the circular spherical seat 23a of the valve plunger 23 is separated from the concave spherical seal 24a of the control valve 24. Consequently, ambient pressure is introduced into the variable pressure chamber 17 through the air passage holes 30a of the boot member 30, the filters 28 and 29, the clearance between the concave spherical seal 24a and the circular spherical seat 23a of the valve plunger 23, and the second air passages 31 and 21 provided in the power piston 13. Due to the pressure differential between the constant pressure chamber 16 and the variable pressure chamber 17, a propulsive force in a forward direction is produced in the power piston 13, thus an assist operation is performed.

The needful stroke (namely invalid stroke) of the brake pedal is required to operate the vacuum booster by a series of the operation, which means that the fluid communication between the constant pressure chamber 16 and the variable pressure chamber 17 is interrupted by the air-tight contact between the valve seat 13c and the control valve element 24, and that ambient (atmospheric) pressure is introduced into the variable pressure chamber 17 in order that the circular spherical seat 23a of the valve plunger 23 is separated from the concave spherical seal 24a of the control valve 24. In the present invention, the needful stroke of the brake pedal does not increase and the small distance X or the size (1−X) in connection with jumping function of the vacuum booster does not change, because the concave spherical seal surface 24a of the control valve member 24 may be constructed just as thick as the thickness portion of a membrane required for shaping the control valve element 24. In the preferred embodiment, the seal surface 24a is provided the same thickness as adjacent regions of the control valve member 24. Referring to FIG. 3, which shows the relationship between the input load (kg) of the vacuum booster and the output load (kg) of the vacuum booster, consequently the hysteresis between the operation and the return of the vacuum booster is decreased as compared with the prior art. As a result, there is no bad influence on the feeling of the brake operation.

Referring particularly to FIG. 2, it is desirable that a radius R of the spherical surface of the concave spherical seal 24a of the control valve 24 equals a distance between the circular spherical seat 23a of the valve plunger 23 and a point of intersection B between the axial center of the valve plunger 23 and the connected lines between a corner of the front end portion 23b of the valve plunger 23 and a corner of the rear end portion 23c of the valve plunger 23.

In the present invention, a response property of the operation of a vacuum booster is able to be higher because there is no invalid stroke of the brake pedal arising from a circular projection of the control valve element being elastically deformed greatly as in the prior art. Also, fluid at ambient pressure flows smoothly because the control valve element and the valve plunger are contacted with each other along spherical surfaces thereof. Furthermore, the valve seat of the power piston becomes to be removed toward the front side so that the front surface of the control valve element formed to concavity spherical surface, thereby shortening the axial direction size of the vacuum booster.

Numerous modifications and variations of the present invention are possible in light of the above teachings. It is therefore to be understood that within the scope of the appended claims, the invention may be practiced otherwise than as specifically described herein.

What is claimed:

1. A vacuum booster, comprising:
   a push rod movable in an axial direction in response to movements of a brake pedal;
   a housing including a front shell and a rear shell connected with each other;
   power piston means located in said housing and dividing an interior of said housing into a constant pressure chamber and a variable pressure chamber with a diaphragm, said power piston means responsive to a pressure differential between said constant pressure chamber and said variable pressure chamber;
   a valve plunger operatively connected with a front end portion of said push rod and located within said power piston;
   a control valve element located in said power piston and contactable with a seat surface of said valve plunger, said control valve element movable in response to movement of said push rod;
   said power piston having a valve seat contactable with said control valve element so that upon contacting of the control valve element and the valve seat of the power piston a fluid communication between said constant pressure chamber and said variable pressure chamber is interrupted;
   said seat surface of said valve plunger being separable from said control valve element so as to produce a pressure differential between said constant pressure chamber and said variable pressure chamber;
   said seat surface of said valve plunger including a circular spherical seat surface, and a seal surface of said control valve element contacted with said seat surface including a concave spherical seal surface which said seat surface of said valve plunger touches internally.

2. A vacuum booster as set forth in claim 1, wherein said concave spherical seal surface has a radius substantially equal to a distance between said circular spherical seat surface of said valve plunger and a point of intersection between an axial center of said valve plunger and a connected line between a corner of a front end portion and a corner of a rear end portion of said valve plunger.

3. A vacuum booster as set forth in claim 1, wherein an outer side surface of said control valve includes a stepped shape.

4. A vacuum booster, comprising:
   a push rod movable in an axial direction in response to movements of a brake pedal;
   a housing including a front shell and a rear shell connected with each other;
   power piston means located in said housing and dividing an interior of said housing into a constant pressure chamber and a variable pressure chamber with a diaphragm, said power piston means responsive to a pressure differential between said constant pressure chamber and said variable pressure chamber;

a valve plunger operatively connected with a front end portion of said push rod and located within said power piston;

a control valve element located in said power piston and contactable with the seat surface of said valve plunger, said control valve element movable in response to movement of said push rod;

said power piston having a valve seat contactable with said control valve element so that upon contacting of the control valve element and the valve seat of the power piston a fluid communication between said constant pressure chamber and said variable pressure chamber is interrupted;

said seat surface of said valve plunger being separable from said control valve element so as to produce a pressure differential between said constant pressure chamber and said variable pressure chamber;

said seat surface of said valve plunger including a circular spherical seat surface, and a seal surface of said control valve element contacted with said seat surface including a concave spherical seal surface which said seat surface of said valve plunger touches internally;

the concave spehrical seal of said control valve element contacted with said seat surface of said valve plunger being of substantially uniform thickness.

* * * * *